United States Patent
Lucas et al.

(10) Patent No.: US 7,975,798 B2
(45) Date of Patent: Jul. 12, 2011

(54) METHOD AND DEVICE FOR CONTROLLING AUTOMATIC EMERGENCY BRAKING

(75) Inventors: Bernhard Lucas, Besigheim (DE); Martin Heinebrodt, Stuttgart (DE); Dirk Meister, Moeglingen (DE); Fred Oechsle, Ludwigsburg (DE); Ulf Wilhelm, Rutesheim (DE); Martin Randler, Immenstaad (DE); Paco Haffmans, Boeblingen (DE); Wolfgang Branz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 769 days.

(21) Appl. No.: 11/792,427

(22) PCT Filed: Nov. 8, 2005

(86) PCT No.: PCT/EP2005/055814
§ 371 (c)(1),
(2), (4) Date: Apr. 3, 2008

(87) PCT Pub. No.: WO2006/061299
PCT Pub. Date: Jun. 15, 2006

(65) Prior Publication Data
US 2009/0038873 A1 Feb. 12, 2009

(30) Foreign Application Priority Data
Dec. 6, 2004 (DE) .................... 10 2004 058 663

(51) Int. Cl.
*B60T 7/22* (2006.01)
(52) U.S. Cl. .................... 180/275; 701/48
(58) Field of Classification Search ............. 180/275, 180/282; 701/48
See application file for complete search history.

(56) References Cited

U.S. PATENT DOCUMENTS

| | | | | |
|---|---|---|---|---|
| 5,314,037 A * | 5/1994 | Shaw et al. | | 180/169 |
| 5,467,283 A * | 11/1995 | Butsuen et al. | | 701/301 |
| 5,529,138 A * | 6/1996 | Shaw et al. | | 180/169 |
| 5,530,651 A * | 6/1996 | Uemura et al. | | 701/301 |
| 5,585,798 A * | 12/1996 | Yoshioka et al. | | 342/70 |
| 6,141,616 A * | 10/2000 | Auffhammer et al. | | 701/70 |
| 6,567,748 B2 * | 5/2003 | Matsuno | | 701/301 |
| 6,574,559 B2 * | 6/2003 | Shinmura et al. | | 701/301 |
| 6,721,659 B2 * | 4/2004 | Stopczynski | | 701/301 |
| 6,971,727 B2 * | 12/2005 | Yoshizawa et al. | | 303/193 |
| 7,034,742 B2 * | 4/2006 | Cong et al. | | 342/70 |
| 7,113,076 B2 * | 9/2006 | Yamamura | | 340/425.5 |
| 7,358,864 B2 * | 4/2008 | Mori et al. | | 340/932.2 |
| 7,425,043 B2 * | 9/2008 | Doerr et al. | | 303/193 |
| 2002/0011373 A1 * | 1/2002 | Wielenga | | 180/275 |
| 2004/0112665 A1 * | 6/2004 | Wielenga | | 180/275 |
| 2009/0210114 A1 * | 8/2009 | Baumann et al. | | 701/45 |

FOREIGN PATENT DOCUMENTS

| | | |
|---|---|---|
| DE | 19912301 | 1/2001 |
| DE | 10231557 | 7/2003 |
| JP | 05 039010 | 2/1993 |
| WO | WO 2004/085220 | 10/2004 |

* cited by examiner

*Primary Examiner* — Paul N Dickson
*Assistant Examiner* — Nicole Verley
(74) *Attorney, Agent, or Firm* — Kenyon & Kenyon LLP

(57) ABSTRACT

A method and a device for controlling automatic emergency braking of a motor vehicle to reduce the severity of a collision of a vehicle with an object, the position and/or speed of the object with respect to the host vehicle being determined via an object detection device, and this information being sent to a collision detection device which ascertains whether a collision with an object is imminent and, on detecting a collision, triggers emergency braking and ascertains a collision instant, emergency braking being terminated after the period of time until the determined collision instant has elapsed.

10 Claims, 3 Drawing Sheets

METHOD AND DEVICE FOR CONTROLLING AUTOMATIC EMERGENCY BRAKING

FIELD OF THE INVENTION

The present invention relates to a method and a device for controlling automatic emergency braking of a vehicle, for reducing the severity of a collision of a vehicle with an object, the position and/or speed of the object being detected with respect to the host vehicle by an object detection device, this information being sent to a collision detection device which ascertains whether collision with an object is imminent and, on detection of a collision, triggers emergency braking and ascertains a collision instant, emergency braking being terminated after the period of time has elapsed until the collision instant that has been ascertained.

BACKGROUND INFORMATION

German Patent Publication No. DE 199 12 301 describes a safety device for a motor vehicle, in particular a passenger vehicle, having at least one impact sensor and one control unit that triggers operation of the vehicle brakes in accordance with the sensor signal, including a signal analyzer circuit which is designed according to the present invention so that the extent of the damage in the event of a rear-end collision is minimized and collision-related damages are largely prevented by the fact that the analyzer circuit responds when the sensor signal rises above a predetermined upper limit value and subsequently drops below a predetermined lower limit value such that the operating brakes of the vehicle are activated simultaneously with the end of the impact shock.

SUMMARY OF THE INVENTION

The core of the present invention is to provide a method and a device for controlling an emergency braking operation in a motor vehicle. Since automatic triggering and implementation of emergency braking are associated with very high risks, emergency braking is usually triggered only when an imminent unavoidable collision is detected, so in most cases the collision is no longer preventable by emergency braking but the intensity of the impact and thus the severity of the collision may be diminished. For the case that emergency braking has been falsely triggered, the object of the present invention is to provide a method and a device via which emergency braking is also deactivatable when detection shows that no collision has occurred, this deactivation of emergency braking being implemented to minimize the risks associated with emergency braking for other traffic participants and the occupants of the vehicle in which emergency braking has been implemented.

A collision detection device is advantageously provided for transmitting a collision detection signal to the collision detection device when a collision occurs. This makes it possible to ascertain reliably whether a collision of the vehicle with an object has in fact occurred at the calculated collision instant or whether emergency braking has been triggered erroneously.

In addition, it is advantageous that the collision detection device detects a collision on the basis of an unsteady change in wheel rotational speeds of all vehicle wheels. Almost all modern vehicles today are equipped with antilock brake systems which have a wheel rotational speed sensor mounted on each wheel to detect whether a vehicle wheel is locked at the moment or at which speed it is rotating. If the wheel rotational speeds of all the vehicle wheels are monitored by wheel rotational speed sensors, a collision is detectable on the basis of a sudden change in the wheel rotational speeds of all vehicle wheels. In the event that only the antilock brake system responds to prevent a wheel from locking up, it is necessary here for preferably all vehicle wheels to be monitored for collision detection to detect a difference between a response of the antilock brake system and collision detection.

In addition, it is advantageous that the collision detection device detects a collision on the basis of an unsteady change in the yaw rate signal. The yaw rate signal indicates the movement of the vehicle about the vertical axis of the vehicle, the vehicle usually experiencing a transverse offset in the event of a collision. This transverse offset is measurable on the basis of an unsteady change in the yaw rate signal and may be used for collision detection.

It is also advantageous that the collision detection device detects a collision on the basis of a triggering signal of an airbag deployment sensor, in particular an acceleration sensor for airbag deployment. Almost all modern vehicles have occupant restraint systems in the form of airbags that are deployable via an acceleration sensor. If the vehicle collides with an object and such an occupant restraint system is deployed, the triggering signal may be forwarded to the collision detection device for detection of a collision.

It is particularly advantageous that the collision detection device detects a collision on the basis of an AND operation of at least two of the conditions of an unsteady change in the wheel rotational speeds of all vehicle wheels, an unsteady change in the yaw rate signal or on the basis of a triggering signal of an airbag deployment sensor. Due to the AND operation of two or three of the collision detection devices mentioned here, it is possible to check the plausibility of the collision detection by using multiple sensors and thus virtually avoid the possibility of erroneous detection of a collision.

It is also advantageous that emergency braking is terminated only after a predetermined period of time after the calculated instant of collision. By using a collision detection algorithm, it is possible to determine the instant of imminent unavoidable collision. Once this instant has been reached but the collision has not yet occurred, a slightly shifted collision instant may be determined on the basis of minor computational deviations from reality. In order not to falsely terminate the deceleration and have to accept a subsequent collision, it is advantageous that after reaching the calculated collision instant, braking is continued for a predetermined period of time $\Delta t$ before deactivation of the deceleration devices terminates emergency braking.

A particularly important implementation of the method according to the present invention is in the form of a control element provided for a control unit of an adaptive distance and cruise control for a motor vehicle. A program capable of running on a computing device, in particular on a microprocessor or signal processor, and suitable for executing the method according to the present invention is stored on this control element. In this case, the present invention is implemented by a program stored on the control element, so this control element furnished with the program represents the present invention in the same way as the method for whose execution the program is suitable. The control element may be in particular an electric memory medium, e.g., a read-only memory.

Additional features, possible applications and advantages of the present invention are derived from the following description of exemplary embodiments of the present invention, which are depicted in the figures of the drawing. All the features described or illustrated here, either alone or in combination, constitute the subject matter of the present invention.

BRIEF DESCRIPTION OF THE DRAWINGS

Exemplary embodiments of the present invention are explained below with reference to the drawings.

DESCRIPTION

Figure 1:
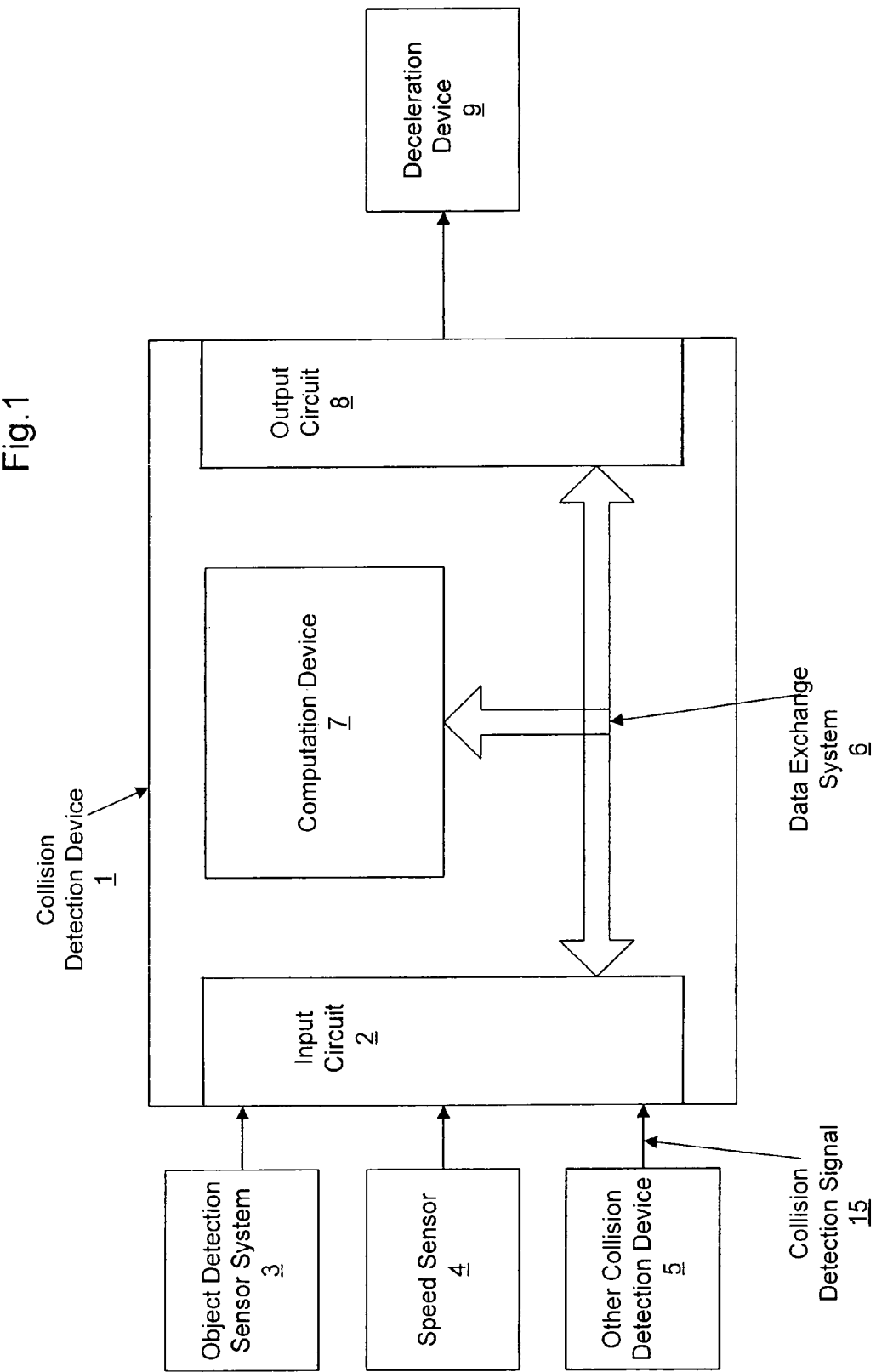
FIG. 1 shows a schematic block diagram of an embodiment of the device according to the present invention.

FIG. 1 shows a collision detection device 1 which uses signals supplied to it to calculate whether an unavoidable collision of the host vehicle with a detected object is imminent and, on detection of an imminent unavoidable collision, calculates collision instant $t_{coll}$ and is able to trigger deceleration devices 9 of the vehicle. To this end, collision detection device 1 has an input circuit 2 via which collision detection device 1 may receive input signals. These input signals include, for example, the distance and relative speed of objects within the detection range of an object detection sensor system 3. Object detection sensor system 3 may be designed, for example, as a radar sensor or laser sensor emitting electromagnetic radiation and determining distance d and relative speed $v_{rel}$ of the detected object with respect to the host vehicle on the basis of the received reflected electromagnetic radiation. In addition, object detection sensor system 3 additionally determines the azimuth angle of the detected objects with respect to the longitudinal axis of the host vehicle and is able to detect the direction of movement of the detected object. In addition, input circuit 2 receives a signal from a speed sensor 4 representing the speed of the host vehicle. By using this speed signal v, it is possible to convert the relative quantities supplied by object detection sensor system 3 into absolute quantities. In addition, by using the quantities describing the host vehicle dynamics, it is also possible to calculate the future path of the host vehicle in advance, to which end detection of the steering angle of the host vehicle may additionally also be included. From knowledge of the movement of the object and the host vehicle, it is possible to ascertain using collision detection algorithms whether an unavoidable collision of the host vehicle with the detected object is imminent and at which instant $t_{coll}$ a possible collision is to be expected. In addition, input circuit 2 receives a collision detection signal 15 from a collision detection device 5. Collision detection device 5 may be designed according to FIG. 2 or FIG. 3, for example, so that collision detection signal 15 notifies input circuit 2 whether a collision has occurred. In collision detection device 1, the signals sent to input circuit 2 are sent via a data exchange system 6 to a computation device 7, which uses a collision detection algorithm to ascertain from the movement dynamics of the detected object and the movement dynamics of the host vehicle whether collision of the vehicle with this object is unavoidably imminent. Such collision detection algorithms are known from the related art, for example, and are also capable of determining in advance predictively calculated collision instant $t_{coll}$. If an unavoidable collision of the vehicle with the detected object is detected, computation device 7 outputs an emergency brake triggering signal, which is output to an output circuit 8 via data exchange device 6. Output circuit 8 relays this emergency brake triggering signal to deceleration devices 9 of the vehicle, including an electrically triggerable braking force regulator with wheel brakes connected thereto. If deceleration device 9 receives an emergency brake triggering signal from computation device 7, the deceleration devices of the vehicle are triggered, so that the vehicle is braked at the maximum possible vehicle deceleration to minimize the intensity of the unavoidable collision. Since automatically triggered and automatically implemented emergency braking is associated with high risks for the occupants of the vehicle and the vehicle surroundings, the present invention provides for emergency braking to be terminated by deactivating deceleration devices 9 of the vehicle if it is recognized that triggering of emergency braking was not appropriate since a collision with the object has not occurred. To this end, a collision is detected by collision detection device 5 and automatic emergency braking is automatically deactivated if no collision has been detected by collision detection device 5 after predictively calculated collision instant $t_{coll}$ has elapsed. To take into account inaccuracies in the computation algorithm and collision instant $t_{coll}$ calculated using that algorithm, it is also possible to wait an additional predetermined period of time $\Delta t$ after the end of calculated collision points in time $t_{coll}$ before deactivating emergency braking if no collision detection signal 15 has been delivered by collision detection device 5 by this point in time $t_{coll}+\Delta t$.

Figure 2:
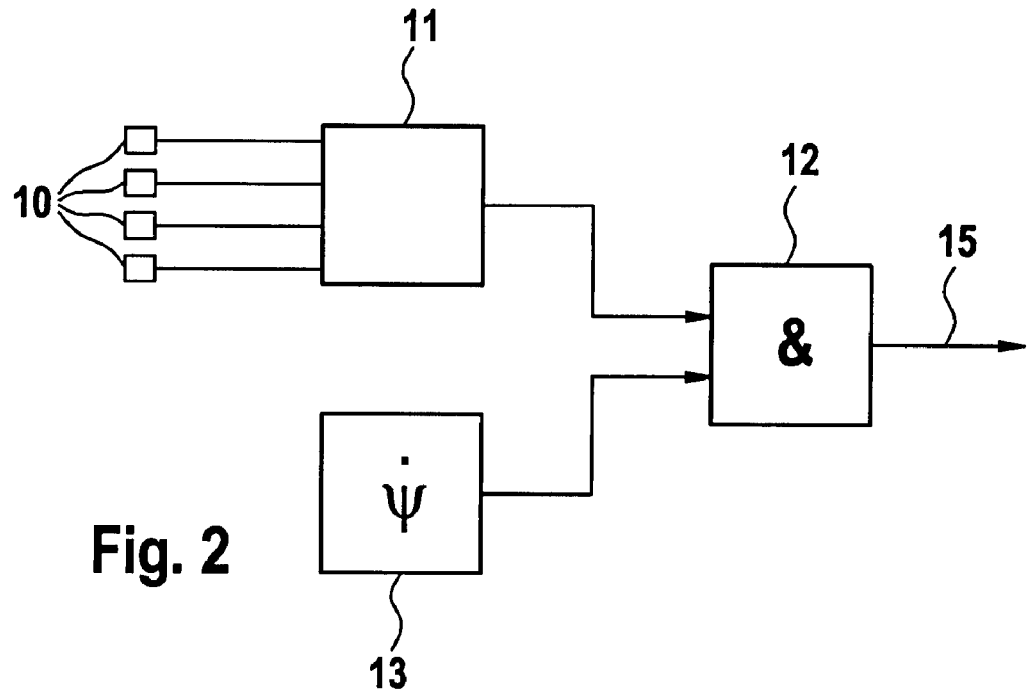
FIG. 2 shows a schematic block diagram of an advantageous refinement of the collision detection device.

FIG. 2 shows another possible embodiment of collision detection device 5. It shows wheel rotational speed sensors 10, which detect the rotational speeds of the individual vehicle wheels and send this information to a wheel rotational speed analyzer device 11. In the event of a collision, the rotational speed of all vehicle wheels are decelerated greatly almost simultaneously, resulting in an unsteady change in all wheel rotational speeds of the vehicle wheels. For collision detection it is necessary here for all wheel rotational speeds to be monitored jointly because in the event of an antilock intervention measure of an antilock device, it is possible even in normal driving operation for a single wheel to have an unsteady change in wheel rotational speed. If wheel rotational speed analyzer device 11 detects that all vehicle wheels are showing an unsteady change in wheel rotational speed, an output signal is generated by wheel rotational speed analyzer device 11 and sent to an AND operation 12. In addition, a yaw rate sensor 13 is provided for detecting the yaw rate of the vehicle and thus analyzing the rotational movements of the vehicle about the vertical axis of the vehicle. In the event of a collision of the vehicle with an object, there is usually a transverse offset of the vehicle, which can be detected by analyzing the yaw rate signal of the yaw rate sensor 13. If such an unsteady change in yaw rate signal is detected, yaw rate sensor 13 delivers an output signal, which is sent as the second input signal to AND element 12. If a collision is detected by wheel rotational speed analyzer device 11 and yaw rate sensor 13 simultaneously, AND element 12 generates an output signal that is sent as collision detection signal 15 to input circuit 2 of collision detection device 1.

Figure 3:
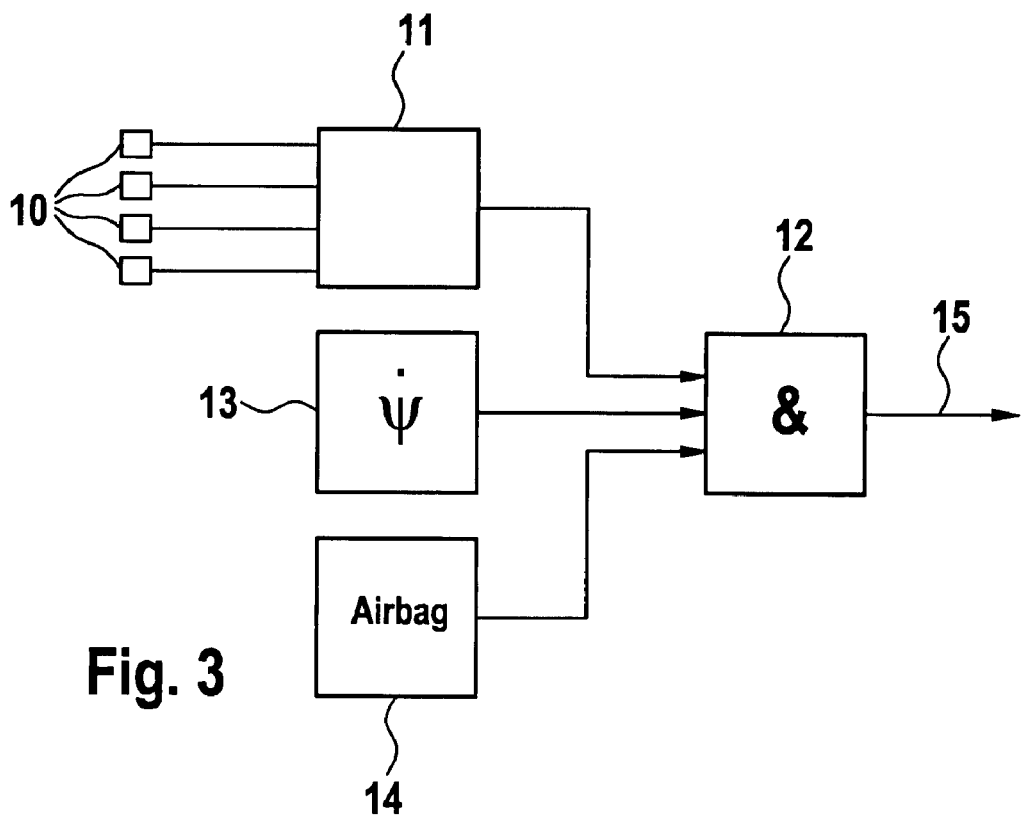
FIG. 3 shows a schematic block diagram of a second refinement of the collision detection device of the device according to the present invention.

In addition, a circuit designed according to the embodiment shown in FIG. 3 may be provided as collision detection device 5. A wheel rotational speed analyzer device 11 is also provided in this collision detection device 5 to monitor the wheel rotational speeds of all vehicle wheels and generate an output signal that is sent to AND element 12 when unsteady changes in the wheel rotational speeds of all the vehicle wheels are detected simultaneously. As in FIG. 2, a yaw rate sensor 13 is again provided to monitor the yaw rate of the vehicle and generate an output signal on the basis of an unsteady change in the yaw rate signal due to a transverse offset of the vehicle caused by a collision, this output signal also being sent to AND element 12. In addition, according to FIG. 3, an airbag deployment sensor 14 which may be designed as an acceleration sensor, for example, is provided for deploying the airbags of the vehicle when the vehicle is decelerated in the longitudinal direction of the vehicle and when the absolute value exceeds the threshold value, thereby protecting the occupants in the event of a collision of the vehicle with an object. If a collision with an object is detected by airbag deployment sensor 14, an output signal is generated and sent as an additional input signal to AND element 12. If AND element 12 detects that wheel rotational speed analyzer device 11, yaw rate sensor 13 and airbag deployment sensor 14 are detecting a collision of the vehicle approximately simultaneously, an output signal is generated by AND element 12 and sent as collision detection signal 15 to input circuit 2 of collision detection device 1.

Figure 4:
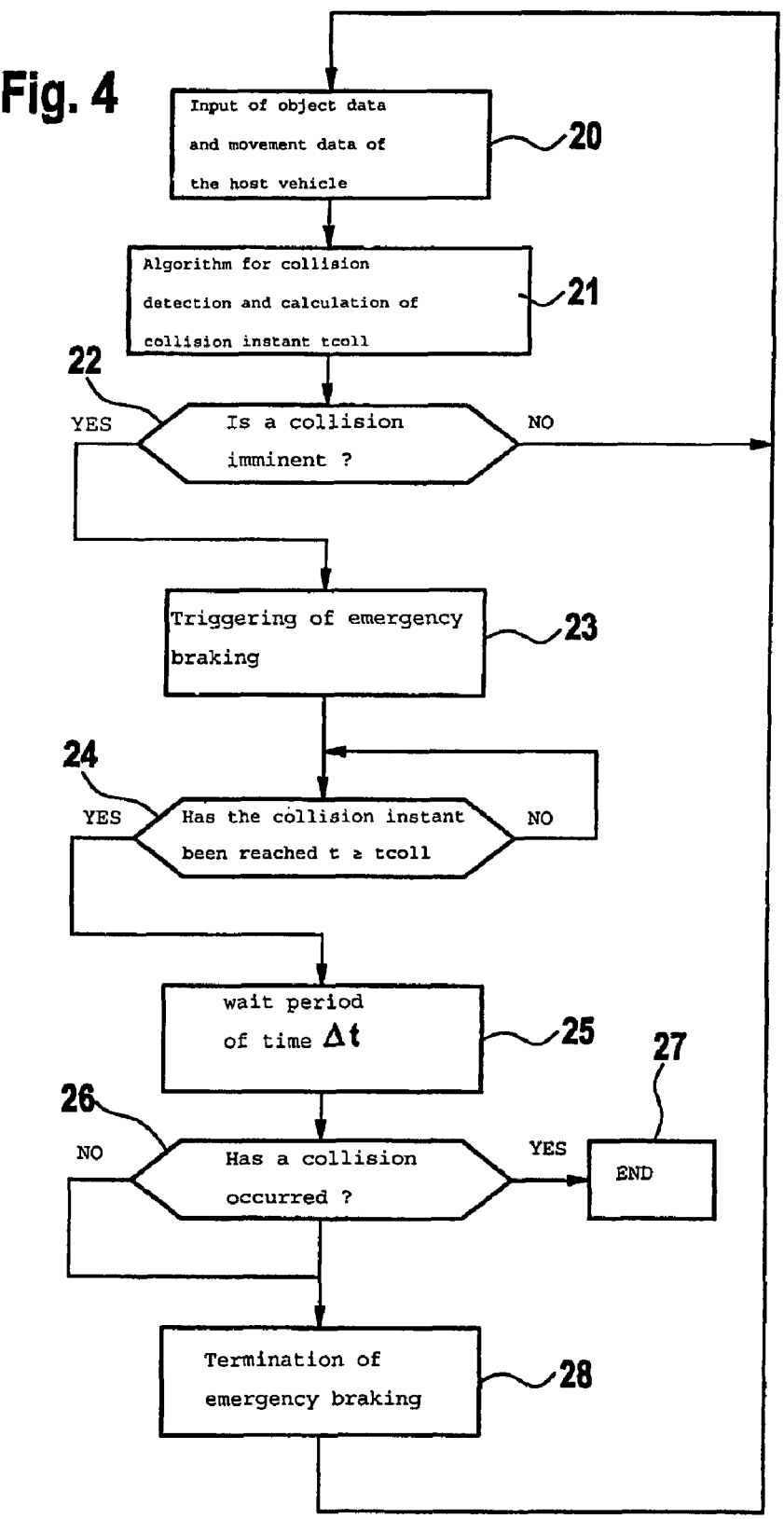
FIG. 4 shows a flow chart of an embodiment of the method according to the present invention.

FIG. 4 shows a schematic flow chart of the method according to the present invention. In step 20, the object data and the host vehicle movement data are input into computation means 7. The values determined by object detection sensor system 3 are input as object data, representing the position and the speed plus possibly the direction of movement of the detected object. As the movement data of the host vehicle, speed v of the host vehicle, supplied by speed sensor 4, and possibly the steering angle values that may be detected by a steering angle sensor are received by computation device 7. In following step 21, data input in step 20 are used to ascertain via a collision detection algorithm whether an unavoidable collision of the host vehicle with the detected object is imminent and, if an unavoidable collision is detected, collision instant $t_{coll}$ is calculated. In following step 22, there is a query to determine whether an unavoidable collision is imminent. If no imminent collision has been detected by the collision detection algorithm, step 22 branches to "no" and the method is run through again, starting at step 20. If step 22 branches to "yes," because the collision detection algorithm in step 21 recognized an unavoidable collision, automatic emergency braking is triggered in step 23 in that vehicle deceleration devices 9 of the vehicle cause the vehicle to decelerate at the maximum possible deceleration. After emergency braking has been triggered in step 23, step 24 ascertains whether collision instant $t_{coll}$ determined in step 21 has already been reached. If collision instant $t_{coll}$ has not yet been reached ($t<t_{coll}$), step 24 branches off to "no," which results in a waiting loop until collision instant $t_{coll}$ is reached. If collision instant $t_{coll}$ calculated in advance by the collision detection algorithm has been reached ($t>t_{coll}$), step 24 branches to "yes" and a period of time $\Delta t$ is waited according to step 25. This period of time $\Delta t$ takes into account the fact that inaccuracies in the collision calculation algorithm or the input data, for example, may have already resulted in an inaccurate determination of collision instant $t_{coll}$ and a collision may occur only shortly after calculated collision instant $t_{coll}$. After waiting for period of time $\Delta t$ and thus after reaching point in time $t_{coll}+\Delta t$, the process ascertains in step 26 whether collision detection device 5 has detected a collision of the vehicle with the detected object. If such a collision has been ascertained, step 26 branches to "yes" and the method is terminated in step 27 because there has been a vehicular collision and continued driving is impossible. If collision detection device 5 has not detected a collision at point in time $t_{coll}+\Delta t$, step 26 branches to "no" and emergency braking is terminated in the next step 28 by deactivating vehicle deceleration devices 9. In this case, it is assumed that triggering of automatic emergency braking has occurred incorrectly due to faulty input signals and the risk to the occupants of the vehicle and/or the vehicle surroundings due to emergency braking may be reduced in that automatic emergency braking is not completed to the point of completely stopping but instead is terminated. After termination of emergency braking according to step 28, the method is run through again, beginning with step 20.

What is claimed is:

1. A device for controlling automatic emergency braking of a motor vehicle for reducing a severity of a collision of a vehicle with an object, comprising:

a collision detection device; and an object detection device for detecting a position and/or speed of the object with respect to a host vehicle and sending information relating thereto to the collision detection device, wherein the collision detection device ascertains whether a collision with the object is imminent and, on detection of an imminent collision, triggers an emergency braking and calculates a collision instant when the collision will occur, and wherein the emergency braking is terminated after the calculated collision instant has elapsed.

2. The device as recited in claim 1, wherein another collision detection device transmits a collision detection signal to the collision detection device when a collision occurs.

3. The device as recited in claim 2, wherein the another collision detection device detects a collision on the basis of an unsteady change in the wheel rotational speeds of all vehicle wheels.

4. The device as recited in claim 2, wherein the another collision detection device detects a collision on the basis of an unsteady change in the yaw rate signal.

5. The device as recited in claim 2, wherein the another collision detection device detects a collision on the basis of a triggering signal of an airbag deployment sensor system that includes an acceleration sensor for airbag deployment.

6. The device as recited in claim 2, wherein the another collision detection device detects a collision on the basis of an AND operation of at least two conditions of:

an unsteady change in the wheel rotational speeds of all vehicle wheels, an unsteady change in the yaw rate signal, and a triggering signal of an airbag deployment sensor system.

7. A method for controlling automatic emergency braking of a motor vehicle to reduce the severity of a collision of the vehicle with an object, comprising:

detecting a position and/or speed of the object with respect to the host vehicle via an object detection device;

sending information relating to the position and/or speed to a collision detection device that ascertains whether a collision with an object is imminent and, when an imminent collision is detected, triggers an emergency braking and calculates a collision instant when the collision will occur; and terminating the emergency braking after the calculated collision instant has elapsed.

8. The method as recited in claim 7, wherein the emergency braking is terminated only after a predetermined instant after the calculated collision instant.

9. A device for controlling automatic emergency braking of a motor vehicle, comprising:
- a collision detection device configured to confirm an occurrence of a collision;
- a collision prediction device configured to identify an imminent collision; and
- an emergency break controller configured to:
    - trigger an emergency break, responsive to the identified imminent collision;
    - calculate a collision instant when the identified imminent collision will occur; and
    - responsive to an elapsing of the collision instant, discontinue the emergency break if the collision detection device indicates no occurrence of a collision.

10. The device of claim 9, wherein the collision instant is calculated by taking into consideration a predetermined error offset period.

* * * * *